US006754188B1

(12) United States Patent
Garahi et al.

(10) Patent No.: US 6,754,188 B1
(45) Date of Patent: Jun. 22, 2004

(54) SYSTEM AND METHOD FOR ENABLING A NODE IN AN AD-HOC PACKET-SWITCHED WIRELESS COMMUNICATIONS NETWORK TO ROUTE PACKETS BASED ON PACKET CONTENT

(75) Inventors: Masood Garahi, Superior, CO (US); Peter J. Stanforth, Winter Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 210 days.

(21) Appl. No.: 09/964,692

(22) Filed: Sep. 28, 2001

(51) Int. Cl.[7] .............................................. H04L 12/56
(52) U.S. Cl. ...................... 370/328; 370/352; 370/392
(58) Field of Search ......................... 370/310.1, 310.2, 370/328, 329, 338, 352, 392

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |

(List continued on next page.)

FOREIGN PATENT DOCUMENTS

| | | |
|---|---|---|
| CA | 2132180 | 3/1996 |
| EP | 0513841 A3 | 11/1992 |
| EP | 0513841 A2 | 11/1992 |
| EP | 0627827 A2 | 12/1994 |
| EP | 0924890 A2 | 6/1999 |

(List continued on next page.)

OTHER PUBLICATIONS

Wong et al., "Soft Handoffs in CDMA Mobile Systems", Dec. 1997, IEEE Personal Communications.

Wong et al., "A Pattern Recognition System for Handoff Algorithm", Jul. 2000, IEEE Journal on Selected Areas in Communications, vol. 18, No. 7.

Richard North, Dale Bryan and Dennis Baker, "Wireless Networked Radios: Comparison of Military, Commerical, and R&D Protocols", Feb. 28–Mar. 3, 1999, 2nd Annual UCSD Conference on Wireless Communications, San Diego CA.

(List continued on next page.)

*Primary Examiner*—Kenneth Vanderpuye
(74) *Attorney, Agent, or Firm*—Gardner Carton & Douglas LLP; Joseph J. Buczynski

(57) ABSTRACT

A system and method for enabling a node, such as a mobile user terminal, in a wireless communications network to route data packets to other nodes in the network based on the information contained in the data packets. The system and method employs a node, adapted for use in a wireless communications network, which comprises a controller that is adapted to examine a content of a data packet addressed to a destination node, that can have an Internet protocol (IP) address to which the data packet is addressed. Based on the content of the data packet, the controller selects a routing path including at least one of a plurality of other nodes in the network via which the data packet is to be routed to the destination node. The controller can compare the content of the data packet to routing information stored in a memory, and select the routing path based on the comparison. Depending on the whether the content is voice, video, file transfer protocol or bulk file transfer type data, to name a few, the controller can select as the routing path a routing path via which the data packet is deliverable from the node to the destination node with low latency, low bit error rate, or in a best effort manner.

63 Claims, 4 Drawing Sheets

U.S. PATENT DOCUMENTS

| | | | | |
|---|---|---|---|---|
| 5,034,961 | A | 7/1991 | Adams | 375/130 |
| 5,068,916 | A | 11/1991 | Harrison et al. | 455/39 |
| 5,231,634 | A | 7/1993 | Giles et al. | 370/95.1 |
| 5,233,604 | A | 8/1993 | Ahmadi et al. | 370/60 |
| 5,241,542 | A | 8/1993 | Natarajan et al. | 370/95.3 |
| 5,317,566 | A | 5/1994 | Joshi | 370/60 |
| 5,392,450 | A | 2/1995 | Nossen | 455/12.1 |
| 5,412,654 | A | 5/1995 | Perkins | 370/94.1 |
| 5,424,747 | A | 6/1995 | Chazelas et al. | 342/70 |
| 5,502,722 | A | 3/1996 | Fulghum | 370/69.1 |
| 5,517,491 | A | 5/1996 | Nanni et al. | 370/29 |
| 5,555,425 | A | 9/1996 | Zeller et al. | 395/800 |
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Woolley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 390/315 |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,046,678 | A * | 4/2000 | Wilk | 370/221 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,064,653 | A * | 5/2000 | Farris | 370/352 |
| 6,067,291 | A | 5/2000 | Kamerman et al. | 370/338 |
| 6,078,566 | A | 6/2000 | Kikinis | 370/286 |
| 6,097,733 | A | 8/2000 | Basu et al. | |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,130,881 | A | 10/2000 | Stiller et al. | 370/238 |
| 6,132,306 | A | 10/2000 | Trompower | 453/11.1 |
| 6,144,651 | A | 11/2000 | Rinchiuso et al. | |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,240,094 | B1 * | 5/2001 | Schneider | 370/412 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,452,922 | B1 * | 9/2002 | Ho | 370/352 |
| 6,490,256 | B1 * | 12/2002 | Jones et al. | 370/277 |
| 6,542,499 | B1 * | 4/2003 | Murphy et al. | 370/352 |
| 2001/0053699 | A1 | 12/2001 | McCrady et al. | 455/513 |

FOREIGN PATENT DOCUMENTS

| | | |
|---|---|---|
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

"OSPF Version 2", Apr. 1998, Internet RFC/STD/FYI/BCP Archives.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wirless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distrubuted Multichannel TDMA Slot Assignment Protocol".

Chip Elliott and Bob Heile, "Self–Organizing, Self–Healing Wireless Networks", 2000 IEEE.

J.J. Garcia–Luna–Aceves and Asimakis Tzamaloukas, "Reversing the Collision–Avoidance Handshake in Wireless Networks".

J.J. Garica–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kameraman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wirless Networks for Quality–of–Service Support".

Martha E. Steenstrup, "Dynamic Multipoint Virtual Circuits for Multimedia Traffic in Multihop Mobile Wirless Networks".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

* cited by examiner

SYSTEM AND METHOD FOR ENABLING A NODE IN AN AD-HOC PACKET-SWITCHED WIRELESS COMMUNICATIONS NETWORK TO ROUTE PACKETS BASED ON PACKET CONTENT

BACKGROUND OF THE INVENTION

1. Field of the Invention

The present invention relates to a system and method for enabling a node, such as a mobile user terminal, in a wireless communications network to route data packets to other nodes in the network based on the information contained in the data packets. More particularly, the present invention relates to a system and method for enabling a node in an ad-hoc packet-switched communications network to examine the contents of data packets to be transmitted by the node, and to designate a routing path including other nodes in the network via which the data packets are routed to a destination node based on the type of data contained in the data packets, to thus meet desired security parameters or packet delivery quality of service (QOS) parameters, such as low bit error rate (BER) or low latency, most suitable for the type of data contained in the data packets.

2. Description of the Related Art

In recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

In these types of ad-hoc networks, the algorithms that are used to determine the path of intermediate nodes via which the data packets are routed between source and destination nodes are typically based on the shortest distance between the source and destination nodes or, assuming that the data packet transport medium is wireless, the least power required to perform the routing. However, such algorithms do not necessarily produce a predictable delivery of data packets. For example, routing of data packets can be delayed due to congestion in intermediate nodes. Also, delivery failure of data packets can occur on noisy radio links between nodes.

Accordingly, a need exists for a system and method for improving the manner in which data packets are delivered between nodes in an ad-hoc communications network.

SUMMARY OF THE INVENTION

An object of the present invention is to provide a system and method for improving the manner in which data packets are delivered between nodes in an ad-hoc communications network.

Another object of the present invention is to provide a system and method for enabling a node, such as a mobile user terminal, in a wireless communications network to route data packets to other nodes in the network based on the information contained in the data packets.

A further object of the present invention it to provide a system and method for achieving the most suitable routing path for the type of data contained in the data packets by enabling a node in an ad-hoc packet-switched communications network to designate a routing path based on desired security parameters or QOS parameters, such as low BER or low latency.

These and other objects are substantially achieved by providing a system and method employing a node, adapted for use in a wireless communications network, which comprises a controller that is adapted to examine a content of a data packet addressed to a destination node, that can have an Internet protocol (IP) address to which the data packet is addressed. Based on the content of the data packet, the controller selects a routing path including at least one of a plurality of other nodes in the network via which the data packet is to be routed to the destination node. The controller can compare the content of the data packet to routing information stored in a memory, and select the routing path based on the comparison. The routing information can include routing information pertaining to an ability of at least one of the nodes to route said data packet to another one of the nodes in the network. Specifically, when the controller determines that the content includes data requiring low latency, such as voice data, the controller selects as the routing path a routing path via which the data packet is deliverable from the node to the destination node in a period of time which is less than a predetermined duration of time. When the controller determines that the content includes data requiring low BER, such as video data, the controller selects as the routing path a routing path via which the data packet is deliverable from the node to the destination node with a bit error rate less than a predetermined bit error rate. However, when the controller determines that the content includes data suitable for best effort routing, such as certain types of bulk file transfer data, the controller selects as the routing path substantially any available routing path via which the data packet is deliverable from the node to the destination node. The node can further include a transceiver which is controllable by the controller to transmit the data packet to the at least one node in the selected routing path. Also, the nodes along the routing path can examine the contents of the data packets and change the routing as necessary to compensate for changes in conditions along the routing path, such as the unavailability of one or more nodes along the routing path or a change in the characteristics of the link between certain nodes, to maintain desired security parameters or QOS parameters for the type of data in the data packets.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
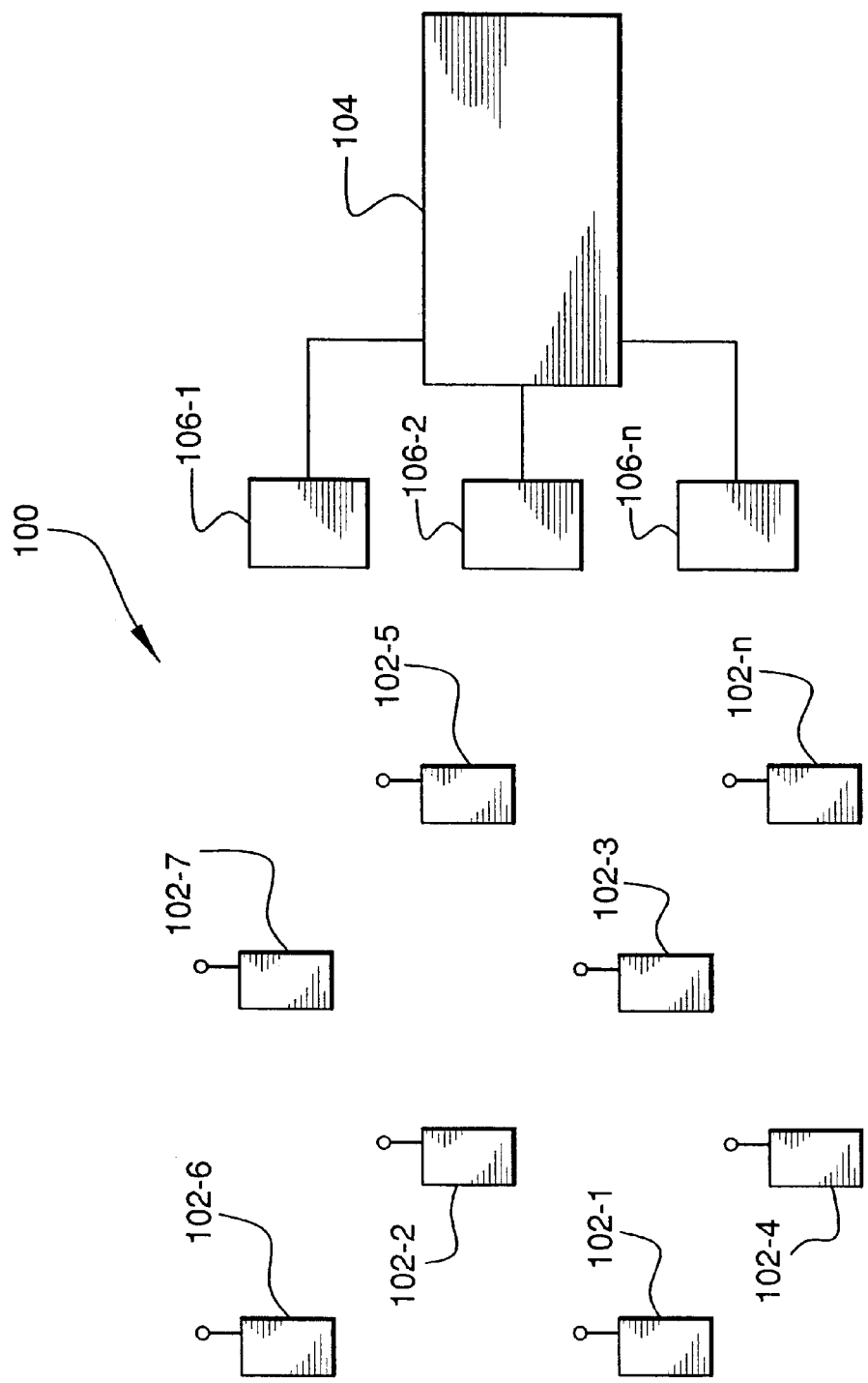
FIG. 1 is a block diagram of an example of an ad-hoc packet-switched wireless communications network employing a system and method for enabling a node, such as a mobile user terminal, in the network to route data packets to other nodes in the network based on the information contained in the data packets according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102), and a fixed network 104 having a plurality of access points 106-1, 106-2, . . . , 106-n, for providing the nodes 102 with access to the fixed network 104. The fixed network 104 includes, for example, a core local access network (LAN), and a plurality of servers and gateway routers, to thus provide the nodes 102 with access to other networks, such as the public switched telephone network (PSTN) and the Internet.

Figure 2:
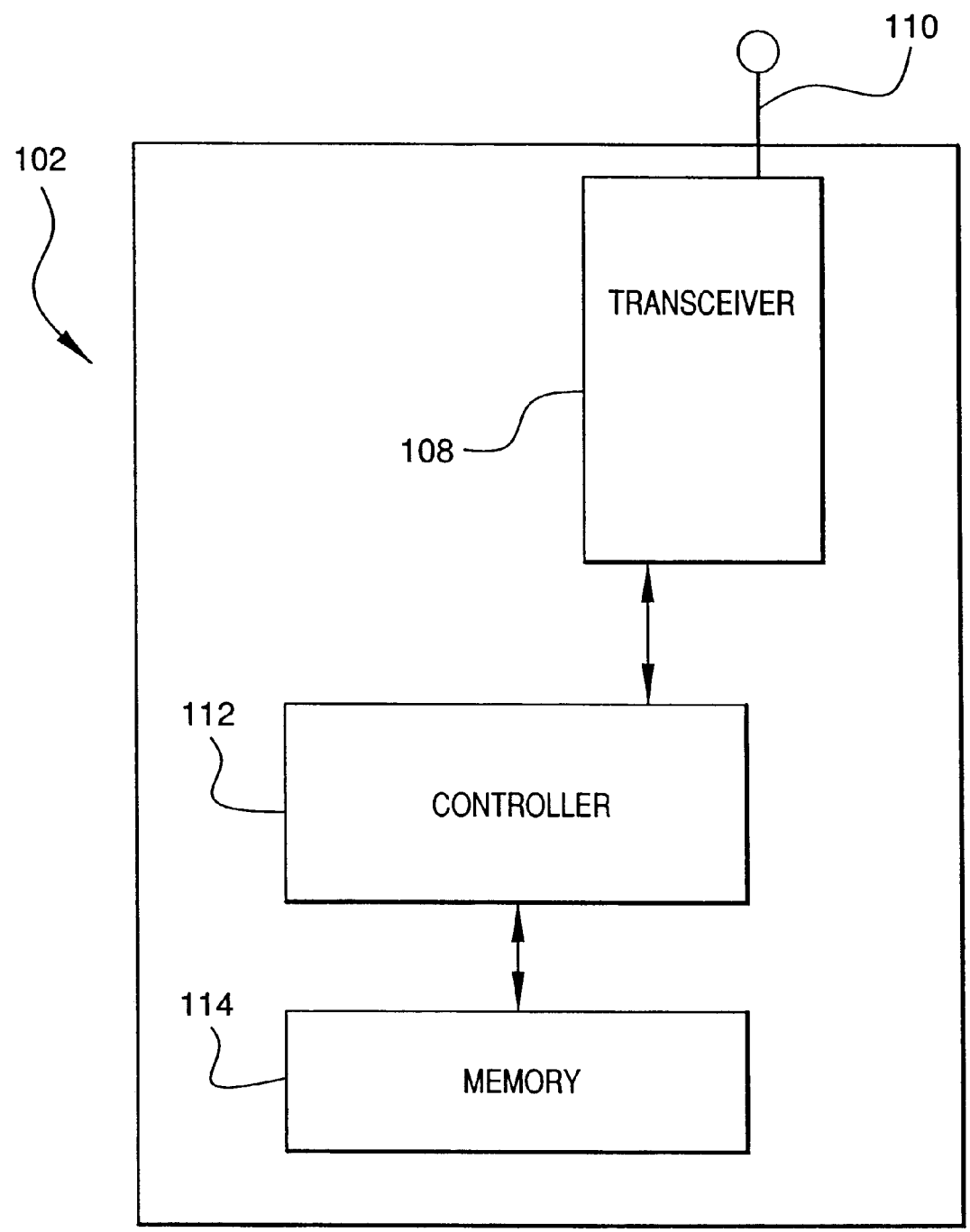
FIG. 2 is a block diagram illustrating an example of a user terminal employed in the network shown in FIG. 1.

As can be appreciated by one skilled in the art, the nodes 102 are capable of communicating with each other directly, or via one or more other nodes 102 operating as a router or routers for data packets being sent between nodes 102, as described in U.S. Pat. No. 5,943,322 to Mayor and in U.S. patent application Ser. Nos. 09/897,790, 09/815,157 and 09/815,164, referenced above. Specifically, as shown in FIG. 2, each node 102 includes a transceiver 108 which is coupled to an antenna 110 and is capable of receiving and transmitting signals, such as packetized data signals, to and from the node 102, under the control of a controller 112. The packetized data signals can include, for example, voice, data or multimedia.

Each node 102 further includes a memory 114, such as a random access memory (RAM), that is capable of storing, among other things, routing information pertaining to itself and other nodes 102 in the network 100. The nodes 102 exchange their respective routing information, referred to as routing advertisements or routing table information, with each other via a broadcasting mechanism periodically, for example, when a new node 102 enters the network 100, or when existing nodes 102 in the network 100 move. A node 102 will broadcast its routing table updates, and nearby nodes 102 will only receive the broadcast routing table updates if within radio frequency (RF) range of the broadcasting node 102. For example, assuming that nodes 102-1, 102-2 and 102-7 are within the RF broadcast range of node 102-6, when node 102-6 broadcasts its routing table information, that information is received by nodes 102-1, 102-2 and 102-7. However, if nodes 102-3, 102-4 and 102-5 through 102-n are out of the broadcast range, none of those nodes will receive the broadcast routing table information from node 102-6.

Each of the nodes 102-1, 102-2 and 102-7 that receive the routing table information from node 102-2 can store all or a relevant portion of that routing table information in their respective memory 114. Typically, each node 102 will perform a pruning operation to reduce the amount of routing table information that it stores in its memory 114 as can be appreciated by one skilled in the art.

It is also noted that when a node 102 broadcasts the routing table information to its neighboring nodes 102, the node 102 can include routing table information pertaining to some or all of its neighboring nodes 102 that it has previously received from them and has stored in its memory 108. Accordingly, a node 102 receiving the broadcast routing table information from another node 102 also receives some information pertaining to the routing capabilities of the neighbors of that other node 102. For example, when node 102-2 broadcasts its routing table information, assuming that nodes 102-1 and 102-3 through 102-7 are within the RF range, those node will receive the routing table information from node 102-2 and update their routing tables accordingly. This routing table information can include information pertaining to, for example, nodes 102-1, 102-6 and 102-7, which are out of RF range of some nodes, such as node 102-3. Hence, node 102-3 can receive routing information pertaining to nodes 102-1, 102-6 and 102-7 via the routing table information broadcast by node 102-2. In this event, a node 102 can store in its memory 114 routing table information pertaining to nodes 102 that are several hops away.

An example of the manner in which a node 102 can communicate data packets to another node 102 in accordance with an embodiment of the present invention will now be described with reference to FIGS. 1–4. Specifically, the controller 112 of a node 102 can determine the intermediate nodes 102 through which to route data packets to a destination node 102 based on the content of the data packets or, in other words, the type of data included in the data packets. The destination node 102 can be the final destination for the data packets or, in other words, the node 102 having the Internet Protocol (IP) address to which the data packets are addressed.

Alternatively, the destination node 102 can itself be the last node along a particular routing path for which node 102-1 has routing table information. In other words, node 102-1 may not have any routing information for nodes 102 that are more hops away than a particular destination node 102, in which event node 102-1 will perform the operations discussed below to select the appropriate route to send the data packets to this destination node 102. The destination node 102 will in turn become a source node and perform similar operations to further route the data packets along an appropriate route to another destination node, which may or may not be the final destination to which the data packets are addressed. The process is then repeated until the data packets ultimately reach their final destination node. Also, the destination node can be an IAP 106 which can route the data packets through the fixed network 104 to other nodes 102 in the network 100 or to user terminals on other networks such as the Internet or PSTN.

The typical types of data packet content can be generally categorized as voice, video and data, with each type of data packet content having a particular delivery criteria. While there are numerous data types and delivery options that can be described, they generally fall between the two extremes of minimum latency and maximum reliability. For purposes of this discussion, voice content, such as real time voice and streaming audio, can be categorized as "Type 1" content which requires minimum latency or, in other words, a minimum amount of delivery time between the source node and the destination node. That is, the voice content should be transmitted between nodes with as little delay as possible so that the users do not experience significant delays or gaps in the audio signals. Also, the maximum allowed latency permitted need not be fixed, but rather, can be configurable based on the desired quality of service (QOS) of the network 100.

On the other hand, video content, such as real time video and video streaming, can be categorized as "Type 2" content which requires the lowest bit error rate (BER) without excessive latency. That is, the video content should be transmitted between nodes with the lowest BER (maximum reliability) so that the users do not experience a degradation in video quality.

Other types of data which do not necessarily require minimal latency or low BER, such as certain types of bulk file transfers, can be categorized as "Type 3" content. This type of data packet content merely requires a "best effort" delivery between nodes.

Figure 3:
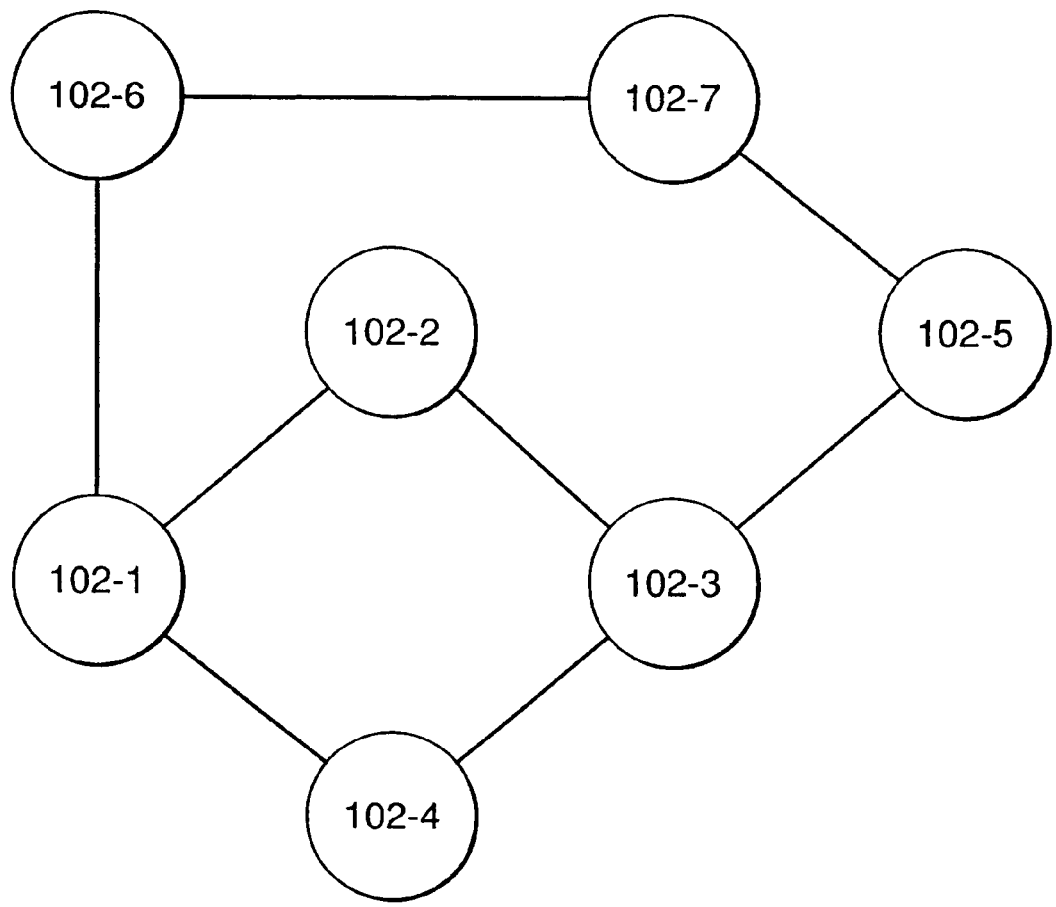
FIG. 3 is a conceptual diagram illustrating examples of routing paths that can be selected by a node in the network shown in FIG. 1 based on the type of data in the data pickets being sent by the node to a destination node.

FIG. 3 is a conceptual diagram illustrating an example of potential routing paths that node 102-1 can consider using to route data packets to node 102-5. According to an embodiment of the present invention, the node 102-1 which is sending the data packets determines the route of intermediate nodes by which the data packets are to be sent to a destination node 102-5 based on the routing information that it has received and stored in its memory 114. The routing information collected and stored by node 1 should include the number of nodes that make up the potential route, the link level interference or noise between each node, and the congestion level of each intermediate node. The noise level will typically be the primary determination of the likelihood of Bit Error Rate (BER) due to interference, although congested nodes may also impact data errors if they are so overloaded that they fail to deliver the data packets.

The number of hops required between the source node 102-1 and destination node 102-5 will be one factor that the controller 112 of node 102-1 can use in determining latency or delay. That is, each additional hop will increase the delay by at least the processing delay necessary for a node 102 to relay the data packet to another node 102. The congestion level of a node 102 will also increase this delay, and thus, is another factor that the controller 112 of node 102-1 will take into account in determining latency of a particular route.

As discussed above, each node 102 can provide this information to its neighboring nodes 102 via broadcast routing table information updates, or in any other suitable manner. Accordingly, node 102-1 can receive and store this information in its memory 114, and use this information in determining a suitable routing path for data packets based on their content. Tables 1 through 3 below illustrate examples of the routing information received and stored by node 102-1 pertaining to the ability of the nodes 102-1 through 102-7 to route data packets for three different potential routing paths.

TABLE 1

Routing Path From Node 102-1 to Node 102-5
Using Intermediate Nodes 102-6 and 102-7

| LINK | CHARACTERISTICS |
|---|---|
| Node 102-1 to Node 102-6 | low BER, low latency |
| Node 102-6 to Node 102-7 | low BER, Node 102-7 congested (high latency) |
| Node 102-7 to Node 102-5 | low BER |

TABLE 2

Routing Path From Node 102-1 to Node 102-5
Using Intermediate Nodes 102-2 and 102-3

| LINK | CHARACTERISTICS |
|---|---|
| Node 102-1 to Node 102-2 | low latency, high BER |
| Node 102-2 to Node 102-3 | low latency, low BER |
| Node 102-3 to Node 102-5 | low latency, low BER |

TABLE 3

Routing Path From Node 102-1 to Node 102-5
Using Intermediate Nodes 102-4 and 102-3

| LINK | CHARACTERISTICS |
|---|---|
| Node 102-1 to Node 102-4 | low BER, medium latency |
| Node 102-4 to Node 102-3 | medium latency, low BER |
| Node 102-3 to Node 102-5 | low latency, low BER |

Figure 4:
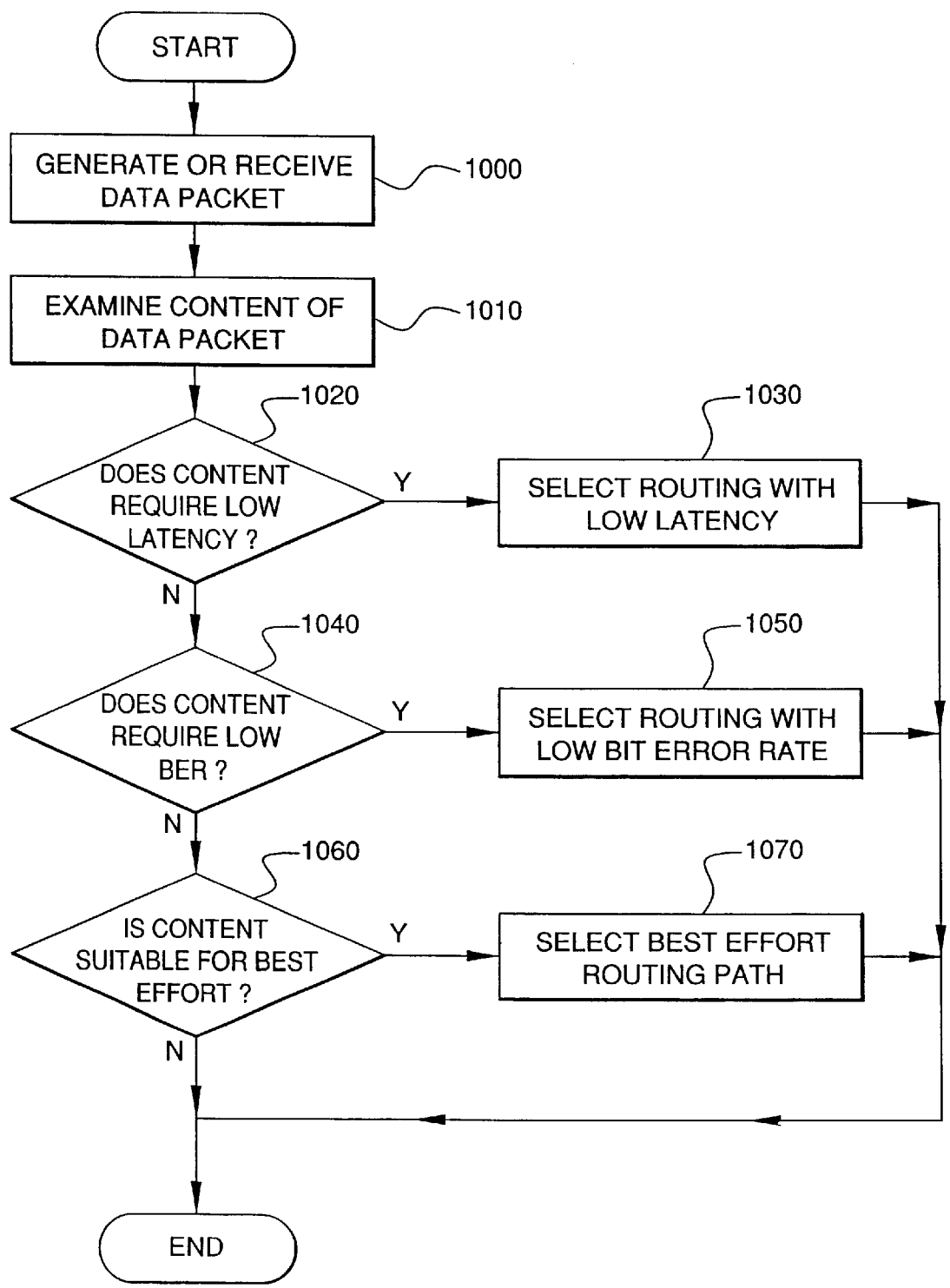
FIG. 4 is a flowchart illustrating an example of operations performed by a node to designate a particular route shown in FIG. 3 via which data packets are routed to a destination node.

The controller 112 of node 102-1 can therefore use the above routing table information to determine which route to use to send a data packet to node 102-5 based on the content of the data packet. For example, as shown in the flowchart of FIG. 4, when the node 102-1 either generates a data packet or receives a data packet for further routing in step 1000, the controller 112 of node 102-1 examines the content of the data packet in step 1010. Beginning at step 1020, the controller 112 of node 102-1 determines and specifies a service delivery parameter for the data packet. Specifically, in step 1020, the controller 112 determines whether the data packet includes data requiring low latency. As discussed above, voice content (Type 1 content) requires the use of a routing path that has very low latency or delay. Therefore, if the node 102-1 is sending a data packet including voice content to node 102-5, the routing algorithm performed by controller 112 should avoid using nodes that are congested, such as node 102-7.

Accordingly, in step 1030, the controller 112 of node 102-1 can send a data packet including Type 1 content to node 102-5 using the route consisting of nodes 102-1, 102-2, 102-3 and 102-5 (Table 2), which delivers the data packet with the least latency of all the three potential routes. Specifically, the controller 112 of node 102-1 will attach routing addresses to the data packet in the form of a header or in any other suitable manner, and control the transceiver 108 of node 102-1 to transmit the data packet to the next neighboring node (node 102-2) in the selected route. When the transceiver 108 of node 102-2 receives the data packet, the controller 112 of node 102-2 will control its transceiver 108 to transmit the data packet to the next node in the route (node 102-3). Likewise, when then the transceiver 108 of node 102-3 receives the data packet, the controller 112 of node 102-3 will control its transceiver 108 to transmit the data packet to the destination node 102-5.

On the other hand, if the controller 112 of node 102-1 determines in step 1020 that the content is not voice content, the processing proceeds to step 1040 where the controller 112 determines if the content is content requiring low BER. As discussed above, video content (Type 2 content) requires low BER. Therefore, if the node 102-1 is sending a data packet including video content to node 102-5, the routing algorithm performed by controller 112 should avoid using links between nodes that experience high BER, such as the links between nodes 102-1 and 102-2. Accordingly, in step 1050, the controller 112 can control node 102-1 to send a data packet including Type 2 content to node 102-5 using the route consisting of nodes 102-1, 102-6, 102-7 and 102-5 (Table 1), which delivers the data packet with low BER.

In this event, the controller 112 of node 102-1 will attach routing addresses to the data packet in the form of a header or in any other suitable manner, and control the transceiver 108 of node 102-1 to transmit the data packet to the next neighboring node (node 102-6) in the selected route. When the transceiver 108 of node 102-6 receives the data packet, the controller 112 of node 102-6 will control its transceiver 108 to transmit the data packet to the next node in the route (node 102-7). Likewise, when then the transceiver 108 of node 102-7 receives the data packet, the controller 112 of node 102-7 will control its transceiver 108 to transmit the data packet to the destination node 102-5.

However, if the controller 112 determines in step 1040 that the content of the data packet is not video data, then the processing proceeds to step 1060 in which the controller 112 can determine whether that the data packet includes data which can tolerate best effort delivery, such as web page data (Type 3 content). The controller 112 can control node 102-1 in step 1070 to send a data packet including Type 3 content to node 102-5 using the route consisting of nodes 102-1, 102-4, 102-3 and 102-5 which, in this example, delivers the data packet with low BER and low to medium latency.

In this event, the controller 112 of node 102-1 will attach routing addresses to the data packet in the form of a header or in any other suitable manner, and control the transceiver 108 of node 102-1 to transmit the data packet to the next neighboring node (node 102-4) in the selected route. When the transceiver 108 of node 102-4 receives the data packet, the controller 112 of node 102-4 will control its transceiver 108 to transmit the data packet to the next node in the route (node 102-3). Likewise, when then the transceiver 108 of node 102-3 receives the data packet, the controller 112 of node 102-3 will control its transceiver 108 to transmit the data packet to the destination node 102-5.

It is noted that the above decision steps 1020, 1040 and 1060 and their associated routing path selection steps 1030, 1050 and 1070, respectively, can be performed by the controller 112 in any desired order. For example, the controller 102 of node 102-1 can first determine whether the data packet content is video data or bulk transfer type data, and perform the necessary transmission or further decision making steps accordingly. In addition, as discussed above, the destination node 102-5 can be the final destination to which the data packet is addressed, or can be an IAP 106 or intermediate node along a larger routing path. If node 102-5 is an intermediate node in a larger routing path, node 102-5 then becomes the source node for the further routing, and performs the processes described above to route the data packet to another destination node, which may or may not be the final destination node having the IP address to which the data packet is addressed.

It is further noted that other types of content can require different delivery criteria or QOS parameters. For example, file transfer protocol (FTP) can tolerate high latency but preferably no packet loss, Web browsing can tolerate reasonable latency and low packet loss, email can tolerate high latency and low packet loss, and streaming audio and video can tolerate reasonable latency but need low packet loss. Furthermore, for security purposes, it may be necessary to avoid sending certain types of data via certain routing paths including nodes that are not deemed to satisfy desired security requirements. For example, it may be necessary to route certain types of data packets via closed groups of nodes. Accordingly, the routing algorithms performed by controller 112 can select the appropriate data packet delivery routes to meet any of these types of security or QOS parameters.

In addition, consistent with the operations and functionality of an ad-hoc network as discussed above, each node 102 along a routing path can examine the contents of the data packets and change their routing as necessary to compensate for changes in conditions along the routing path, such as the unavailability of one or more nodes along the routing path or a change in the characteristics of the link between certain nodes, to maintain desired security parameters or QOS parameters for the type of data in the data packets. This is necessary because the node establishing the routing path (e.g., node 102-1 as discussed above) may do this without knowing all the details of the underlying network or, at best, based on only an instantaneous view of the network. As the packet transitions through the network 100, the network characteristics may change due to terminal mobility, radio interference, congestion and other factors. Thus the desired route and/or delivery parameters may not be achievable. Accordingly, if the intermediate nodes 102 along the delivery path can examine the packet contents, they can use their more accurate and up to date information about the network 100 to decide if the current route is appropriate or if a better, or at least acceptable, alternative can be found.

For example, assume that node 102-1 has designated the delivery path shown in Table 1 above, which uses nodes 102-6 and 102-7 as intermediate nodes to route a data packet to destination node 102-5. When the data packets have been received by node 102-6, the controller 112 of node 102-6 can examine the contents of the data packets and determine whether the link between node 102-6 and 102-7 still meets the desired criteria to achieve the security or QOS parameters designated by the controller 112 of node 102-1. If so, then node 102-6 can send the data packets to node 102-7.

However, if node 102-7 is no longer available, or if the conditions of the link between nodes 102-6 and 102-7 have changed so that the desired security or QOS parameters cannot be maintained, the controller 112 of node 102-6 can determine based on the content of the data packets and, for example, routing table information stored in the memory 114 of node 102-6, whether the data packets should be sent to another node, such as node 102-2, in order to meet the desired parameters. Also, even if node 102-7 is available, the controller 112 of node 102-6 can determine, based on the contents of the data packets and the routing table parameters, whether another route would be more suitable to achieve the desired security or QOS parameters.

If the controller 112 of node 102-6 determines that node 102-2 is more suitable for any of the reasons discussed above, then the controller 112 of node 102-6 can control the transceiver 108 of node 102-6 to send the data packets to node 102-2. Upon receiving the data packets, the controller 112 of node 102-2 can perform a similar examination of the contents of the data packets in view of the routing table information stored in memory 114 of node 102-2 to determine the best manner to route the data packets to destination node 102-5 in order to maintain the desired security or QOS parameters designated by node 102-1. These processes can be performed by all the nodes 102 that receive the data packets to assure that the delivery parameters are maintained.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A node, adapted for use in a wireless communications network, said node comprising:
   a controller, adapted to examine a content of a data packet addressed to a destination node and, based on said content of said data packet, to select a routing path including at least one of a plurality of other nodes in said network via which said data packet is to be routed to said destination node;
   wherein when said controller determines that said content includes voice data, said controller selects as said routing path a routing path via which said data packet is deliverable from said node to said destination node in a period of time which is less than a predetermined duration of time; and
   wherein said controller is further adapted to examine a content of another data packet addressed to said destination node and to assess a criteria of said routing path, and based on the content of said another data packet and the assessed criteria, determine whether to route said another data packet along said routing path or to select a different routing path.

2. A node as claimed in claim 1, further comprising:
   a transceiver, adapted to transmit said data packet to any of a plurality of nodes in a wireless communications network; and
   wherein said controller is adapted to control said transceiver to transmit said data packet to said at least one node in said selected routing path.

3. A node as claimed in claim 1, wherein:
   said controller is further adapted to compare said content of said data packet to routing information stored in a memory, and to select said routing path based on said comparison.

4. A node as claimed in claim 3, wherein:
   said routing information includes routing information pertaining to an ability of at least one of said nodes to route said data packet to another one of said nodes.

5. A node as claimed in claim 1, wherein:
   when said controller determines that said content includes video data, said controller selects as said routing path a routing path via which said data packet is deliverable from said node to said destination node with a bit error rate less than a predetermined bit error rate.

6. A node as claimed in claim 1, wherein:
   when said controller determines that said content includes a particular type of data, said controller selects as said routing path substantially any available routing path via which said data packet is deliverable from said node to said destination node.

7. A node as claimed in claim 1, wherein:
   said destination node has an Internet protocol (IP) address to which said data packet is addressed.

8. A method for controlling a node, adapted for use in a wireless communications network, to transmit a data packet to a destination node, said method comprising:
   examining a content of said data packet addressed to said destination node;
   based on said content of said data packet, selecting a routing path including at least one of a plurality of other nodes in said network via which said data packet is to be routed to said destination node;
   wherein when said examining determines that said content includes voice data, said selecting selects as said routing path a routing path via which said data packet is deliverable from said node to said destination node in a period of time which is less than a predetermined duration of time; and
   wherein the method further comprises examining a content of another data packet addressed to said destination node and to assess a criteria of said routing path, and based on the content of said another data packet and the assessed criteria, determining whether to route said another data packet along said routing path or to select a different routing path.

9. A method as claimed in claim 8, further comprising:
   transmitting said data packet to said at least one node in said selected routing path.

10. A method as claimed in claim 8, further comprising:
    comparing said content of said data packet to routing information stored in a memory; and
    wherein said selecting includes selecting said routing path based on said comparison.

11. A method as claimed in claim 10, wherein:
    said routing information includes routing information pertaining to an ability of at least one of said nodes to route said data packet to another one of said nodes.

12. A method as claimed in claim 8, wherein:
    when said examining determines that said content includes video data, said selecting selects as said routing path a routing path via which said data packet is deliverable from said node to said destination node with a bit error rate less than a predetermined bit error rate.

13. A method as claimed in claim 8, wherein:
    when said examining determines that said content includes a particular type of data, said selecting selects as said routing path substantially any available routing path via which said data packet is deliverable from said node to said destination node.

14. A method as claimed in claim 8, wherein:
    said destination node has an Internet protocol (IP) address to which said data packet is addressed.

15. A computer readable medium of instructions for controlling a node, adapted for use in a wireless communications network, to transmit a data packet to a destination node, said computer readable medium of instructions comprising:
    a first set of instructions, adapted to control said node to examine a content of said data packet addressed to said destination node;
    a second set of instructions, adapted to control said node, based on said content of said data packet, to select a routing path including at least one of a plurality of other nodes in said network via which said data packet is to be routed to said destination node;

wherein when said examining determines that said content includes voice data, said second set of instructions is adapted to control said node to select as said routing path a routing path via which said data packet is deliverable from said node to said destination node in a period of time which is less than a predetermined duration of time; and said computer readable medium of instructions further comprises a third set of instructions, adapted to control said node to examine a content of another data packet addressed to said destination node and to assess a criteria of said routing path, and based on the content of said another data packet and the assessed criteria, determine whether to route said another data packet along said routing path or to select a different routine path.

16. A computer readable medium of instructions as claimed in claim 15, further comprising:

a third set of instructions, adapted to control said node to transmit said data packet to said at least one node in said selected routing path.

17. A computer readable medium of instructions as claimed in claim 15, further comprising:

a fourth set of instructions, adapted to control said node to compare said content of said data packet to routing information stored in a memory; and wherein said second set of instructions is adapted to control said node to select said routing path based on said comparison.

18. A computer readable medium of instructions as claimed in claim 17, wherein:

said routing information includes routing information pertaining to an ability of at least one of said nodes to route said data packet to another one of said nodes.

19. A computer readable medium of instructions as claimed in claim 15, wherein:

when said examining determines that said content includes video data, said second set of instructions is adapted to control said node to select as said routing path a routing path via which said data packet is deliverable from said node to said destination node with a bit error rate less than a predetermined bit error rate.

20. A computer readable medium of instructions as claimed in claim 15, wherein:

when said examining determines that said content includes a particular type of data, said second set of instructions is adapted to control said node to select as said routing path substantially any available routing path via which said data packet is deliverable from said node to said destination node.

21. A computer readable medium of instructions as claimed in claim 15, wherein:

said destination node has an Internet protocol (IP) address to which said data packet is addressed.

22. A node, adapted for use in a wireless communications network, said node comprising:

a controller, adapted to examine a content of a data packet addressed to a destination node and, based on said content of said data packet, to select a routing path including at least one of a plurality of other nodes in said network via which said data packet is to be routed to said destination node;

wherein when said controller determines that said content includes video data, said controller selects as said routing path a routing path via which said data packet is deliverable from said node to said destination node with a bit error rate less than a predetermined bit error rate; and wherein said controller is further adapted to examine a content of another data packet addressed to said destination node and to assess a criteria of said routing path, and based on the content of said another data packet and the assessed criteria, determine whether to route said another data packet along said routing path or to select a different routing path.

23. A node as claimed in claim 22, further comprising:

a transceiver, adapted to transmit said data packet to any of a plurality of nodes in a wireless communications network; and wherein said controller is adapted to control said transceiver to transmit said data packet to said at least one node in said selected routing path.

24. A node as claimed in claim 22, wherein:

said controller is further adapted to compare said content of said data packet to routing information stored in a memory, and to select said routing path based on said comparison.

25. A node as claimed in claim 24, wherein:

said routing information includes routing information pertaining to an ability of at least one of said nodes to route said data packet to another one of said nodes.

26. A node as claimed in claim 22, wherein:

when said controller determines that said content includes a particular type of data, said controller selects as said routing path substantially any available routing path via which said data packet is deliverable from said node to said destination node.

27. A node as claimed in claim 22, wherein:

said destination node has an Internet protocol (IP) address to which said data packet is addressed.

28. A node, adapted for use in a wireless communications network, said node comprising:

a controller, adapted to examine a content of a data packet addressed to a destination node and, based on said content of said data packet, to select a routing path including at least one of a plurality of other nodes in said network via which said data packet is to be routed to said destination node;

wherein when said controller determines that said content includes a particular type of data, said controller selects as said routing path substantially any available routing path via which said data packet is deliverable from said node to said destination node; and wherein said controller is further adapted to examine a content of another data packet addressed to said destination node and to assess a criteria of said routing path, and based on the content of said another data packet and the assessed criteria, determine whether to route said another data packet along said routing path or to select a different routing path.

29. A node as claimed in claim 28, further comprising:

a transceiver, adapted to transmit said data packet to any of a plurality of nodes in a wireless communications network; and wherein said controller is adapted to control said transceiver to transmit said data packet to said at least one node in said selected routing path.

30. A node as claimed in claim 28, wherein:
said controller is further adapted to compare said content of said data packet to routing information stored in a memory, and to select said routing path based on said comparison.

31. A node as claimed in claim 30, wherein:
said routing information includes routing information pertaining to an ability of at least one of said nodes to route said data packet to another one of said nodes.

32. A node as claimed in claim 28, wherein:
said destination node has an Internet protocol (IP) address to which said data packet is addressed.

33. A method for controlling a node, adapted for use in a wireless communications network, to transmit a data packet to a destination node, said method comprising:
examining a content of said data packet addressed to said destination node;
based on said content of said data packet, selecting a routing path including at least one of a plurality of other nodes in said network via which said data packet is to be routed to said destination node;
wherein when said examining determines that said content includes video data, said selecting selects as said routing path a routing path via which said data packet is deliverable from said node to said destination node with a bit error rate less than a predetermined bit error rate; and
wherein the method further comprises examining a content of another data packet addressed to said destination node and to assess a criteria of said routing path, and based on the content of said another data packet and the assessed criteria, determining whether to route said another data packet along said routing path or to select a different routing path.

34. A method as claimed in claim 33, further comprising:
transmitting said data packet to said at least one node in said selected routing path.

35. A method as claimed in claim 33, further comprising:
comparing said content of said data packet to routing information stored in a memory; and
wherein said selecting includes selecting said routing path based on said comparison.

36. A method as claimed in claim 35, wherein:
said routing information includes routing information pertaining to an ability of at least one of said nodes to route said data packet to another one of said nodes.

37. A method as claimed in claim 33, wherein:
when said examining determines that said content includes a particular type of data, said selecting selects as said routing path substantially any available routing path via which said data packet is deliverable from said node to said destination node.

38. A method as claimed in claim 33, wherein:
said destination node has an Internet protocol (IP) address to which said data packet is addressed.

39. A method for controlling a node, adapted for use in a wireless communications network, to transmit a data packet to a destination node, said method comprising:
examining a content of said data packet addressed to said destination node;
based on said content of said data packet, selecting a routing path including at least one of a plurality of other nodes in said network via which said data packet is to be routed to said destination node;
wherein when said examining determines that said content includes a particular type of data, said selecting selects as said routing path substantially any available routing path via which said data packet is deliverable from said node to said destination node; and
wherein the method further comprises examining a content of another data packet addressed to said destination node and to assess a criteria of said routing path, and based on the content of said another data packet and the assessed criteria, determining whether to route said another data packet along said routing path or to select a different routing path.

40. A method as claimed in claim 39, further comprising:
transmitting said data packet to said at least one node in said selected routing path.

41. A method as claimed in claim 39, further comprising:
comparing said content of said data packet to routing information stored in a memory; and
wherein said selecting includes selecting said routing path based on said comparison.

42. A method as claimed in claim 41, wherein:
said routing information includes routing information pertaining to an ability of at least one of said nodes to route said data packet to another one of said nodes.

43. A method as claimed in claim 39, wherein:
said destination node has an Internet protocol (IP) address to which said data packet is addressed.

44. A computer readable medium of instructions for controlling a node, adapted for use in a wireless communications network, to transmit a data packet to a destination node, said computer readable medium of instructions comprising:
a first set of instructions, adapted to control said node to examine a content of said data packet addressed to said destination node;
a second set of instructions, adapted to control said node, based on said content of said data packet, to select a routing path including at least one of a plurality of other nodes in said network via which said data packet is to be routed to said destination node;
wherein when said examining determines that said content includes video data, said second set of instructions is adapted to control said node to select as said routing path a routing path via which said data packet is deliverable from said node to said destination node with a bit error rate less than a predetermined bit error rate; and
said computer readable medium of instructions further comprises a third set of instructions, adapted to control said node to examine a content of another data packet addressed to said destination node and to assess a criteria of said routing path, and based on the content of said another data packet and the assessed criteria, determine whether to route said another data packet along said routing path or to select a different routing path.

45. A computer readable medium of instructions as claimed in claim 44, further comprising:
a third set of instructions, adapted to control said node to transmit said data packet to said at least one node in said selected routing path.

46. A computer readable medium of instructions as claimed in claim 44, further comprising:
a fourth set of instructions, adapted to control said node to compare said content of said data packet to routing information stored in a memory; and wherein said second set of instructions is adapted to control said node to select said routing path based on said comparison.

47. A computer readable medium of instructions as claimed in claim 46, wherein:
said routing information includes routing information pertaining to an ability of at least one of said nodes to route said data packet to another one of said nodes.

48. A computer readable medium of instructions as claimed in claim 44, wherein:
when said examining determines that said content includes a particular type of data, said second set of instructions is adapted to control said node to select as said routing path substantially any available routing path via which said data packet is deliverable from said node to said destination node.

49. A computer readable medium of instructions as claimed in claim 44, wherein:
said destination node has an Internet protocol (IP) address to which said data packet is addressed.

50. A computer readable medium of instructions for controlling a node, adapted for use in a wireless communications network, to transmit a data packet to a destination node, said computer readable medium of instructions comprising:
a first set of instructions, adapted to control said node to examine a content of said data packet addressed to said destination node;
a second set of instructions, adapted to control said node, based on said content of said data packet, to select a routing path including at least one of a plurality of other nodes in said network via which said data packet is to be routed to said destination node;
wherein when said examining determines that said content includes a particular type of data, said second set of instructions is adapted to control said node to select as said routing path substantially any available routing path via which said data packet is deliverable from said node to said destination node; and
said computer readable medium of instructions further comprises a third set of instructions, adapted to control said node to examine a content of another data packet addressed to said destination node and to assess a criteria of said routing path, and based on the content of said another data packet and the assessed criteria, determine whether to route said another data packet along said routing path or to select a different routing path.

51. A computer readable medium of instructions as claimed in claim 50, further comprising:
a third set of instructions, adapted to control said node to transmit said data packet to said at least one node in said selected routing path.

52. A computer readable medium of instructions as claimed in claim 50, further comprising:
a fourth set of instructions, adapted to control said node to compare said content of said data packet to routing information stored in a memory; and
wherein said second set of instructions is adapted to control said node to select said routing path based on said comparison.

53. A computer readable medium of instructions as claimed in claim 52, wherein:
said routing information includes routing information pertaining to an ability of at least one of said nodes to route said data packet to another one of said nodes.

54. A computer readable medium of instructions as claimed in claim 50, wherein:
said destination node has an Internet protocol (IP) address to which said data packet is addressed.

55. A node as claimed in claim 1, wherein:
the wireless communications network comprises a wireless ad-hoc peer-to-peer network in which said node is operable and mobile while its controller performs the functions of examining the content of said data packet and choosing at least one of said other nodes for said routing path instead of a different one of said other nodes due to the content of said data packet and respective link conditions between said node and said at least one other node and said different node, and while its controller performs the functions of examining the content of said another data packet, assessing said criteria of said routing path and determining whether to route said another data packet along said routing path or to select a different routing path.

56. A method as claimed in claim 8, wherein:
the wireless communications network comprises a wireless ad-hoc peer-to-peer network in which said node is operable and mobile while said node performs the functions of examining the content of said data packet and choosing at least one of said other nodes for said routing path instead of a different one of said other nodes due to the content of said data packet and respective link conditions between said node and said at least one other node and said different node, and while said node performs the functions of examining the content of said another data packet, assessing said criteria of said routing path and determining whether to route said another data packet along said routing path or to select a different routing path.

57. A computer readable medium of instructions as claimed in claim 15, wherein:
the wireless communications network comprises a wireless ad-hoc peer-to-peer network in which said node is operable and mobile while said node performs the functions of examining the content of said data packet and choosing at least one of said other nodes for said routing path instead of a different one of said other nodes due to the content of said data packet and respective link conditions between said node and said at least one other node and said different node, and while said node performs the functions of examining the content of said another data packet, assessing said criteria of said routing path and determining whether to route said another data packet along said routing path or to select a different routing path.

58. A node as claimed in claim 22, wherein:
the wireless communications network comprises a wireless ad-hoc peer-to-peer network in which said node is operable and mobile while its controller performs the functions of examining the content of said data packet and choosing at least one of said other nodes for said routing path instead of a different one of said other nodes due to the content of said data packet and respective link conditions between said node and said at least one other node and said different node, and while its controller performs the functions of examining the content of said another data packet, assessing said criteria of said routing path and determining whether to route said another data packet along said routing path or to select a different routing path.

59. A node as claimed in claim 28, wherein:

the wireless communications network comprises a wireless ad-hoc peer-to-peer network in which said node is operable and mobile while its controller performs the functions of examining the content of said data packet and choosing at least one of said other nodes for said routing path instead of a different one of said other nodes due to the content of said data packet and respective link conditions between said node and said at least one other node and said different node, and while its controller performs the functions of examining the content of said another data packet, assessing said criteria of said routing path and determining whether to route said another data packet along said routing path or to select a different routing path.

60. A method as claimed in claim 33, wherein:

the wireless communications network comprises a wireless ad-hoc peer-to-peer network in which said node is operable and mobile while said node performs the functions of examining the content of said data packet and choosing at least one of said other nodes for said routing path instead of a different one of said other nodes due to the content of said data packet and respective link conditions between said node and said at least one other node and said different node, and while said node performs the functions of examining the content of said another data packet, assessing said criteria of said routing path and determining whether to route said another data packet along said routing path or to select a different routing path.

61. A method as claimed in claim 39, wherein:

the wireless communications network comprises a wireless ad-hoc peer-to-peer network in which said node is operable and mobile while said node performs the functions of examining the content of said data packet and choosing at least one of said other nodes for said routing path instead of a different one of said other nodes due to the content of said data packet and respective link conditions between said node and said at least one other node and said different node, and while said node performs the functions of examining the content of said another data packet, assessing said criteria of said routing path and determining whether to route said another data packet along said routing path or to select a different routing path.

62. A computer readable medium of instructions as claimed in claim 44, wherein:

the wireless communications network comprises a wireless ad-hoc peer-to-peer network in which said node is operable and mobile while said node performs the functions of examining the content of said data packet and choosing at least one of said other nodes for said routing path instead of a different one of said other nodes due to the content of said data packet and respective link conditions between said node and said at least one other node and said different node, and while said node performs the functions of examining the content of said another data packet, assessing said criteria of said routing path and determining whether to route said another data packet along said routing path or to select a different routing path.

63. A computer readable medium of instructions as claimed in claim 50, wherein:

the wireless communications network comprises a wireless ad-hoc peer-to-peer network in which said node is operable and mobile while said node performs the functions of examining the content of said data packet and choosing at least one of said other nodes for said routing path instead of a different one of said other nodes due to the content of said data packet and respective link conditions between said node and said at least one other node and said different node, and while said node performs the functions of examining the content of said another data packet, assessing said criteria of said routing path and determining whether to route said another data packet along said routing path or to select a different routing path.

* * * * *